(12) United States Patent
Pai et al.

(10) Patent No.: US 8,368,650 B2
(45) Date of Patent: Feb. 5, 2013

(54) MOUSE WITH SHOOTING FUNCTION AND IMAGE PICKUP SYSTEM

(75) Inventors: Tung-Hsuan Pai, Taipei (TW); Yu-Ling Chuang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 245 days.

(21) Appl. No.: 13/009,672

(22) Filed: Jan. 19, 2011

(65) Prior Publication Data

US 2012/0113006 A1    May 10, 2012

(30) Foreign Application Priority Data

Nov. 5, 2010   (TW) ................................ 99138103 A

(51) Int. Cl.
   *G06F 3/033* (2006.01)
(52) U.S. Cl. ...................................................... 345/163
(58) Field of Classification Search .................... 345/163
   See application file for complete search history.

(56) References Cited

U.S. PATENT DOCUMENTS

2006/0227110 A1* 10/2006 Liao ............................... 345/163
2009/0289110 A1* 11/2009 Regen et al. ................... 235/380

* cited by examiner

*Primary Examiner* — Quan-Zhen Wang
*Assistant Examiner* — David Lee
(74) *Attorney, Agent, or Firm* — Kirton McConkie; Evan R. Witt

(57) ABSTRACT

A mouse with a shooting function and an image pickup system are provided. The image pickup system includes a mouse and a computer system. A shooting program is installed in the computer system. The mouse includes an image pickup device and a supporting member. The supporting member is used for fixing a business card. The shooting program is executed to judge whether the business card is separated from the image pickup device by a shooting distance, which is equal to a focal length of the image pickup device. If the business card is separated from the image pickup device by the shooting distance, the image pickup device is enabled by the shooting program to shoot the business card, thereby acquiring a business card image.

13 Claims, 3 Drawing Sheets

MOUSE WITH SHOOTING FUNCTION AND IMAGE PICKUP SYSTEM

FIELD OF THE INVENTION

The present invention relates to a mouse with a shooting function and an image pickup system, and more particularly to a mouse with an image pickup device and an image pickup system using such a mouse.

BACKGROUND OF THE INVENTION

With rapid development of electronic and information industries, image pickup devices become essential electronic devices in our daily lives. Generally, image pickup devices are used to take photographs or record video data. In addition, image pickup devices are also applied to web cameras for making a video conference. Recently, the built-in image pickup devices of notebook computer or the external pickup devices connected with desktop computers are gradually adopted.

With increasing development of digital techniques, text documents are gradually created as electronic files. Generally, text documents are scanned by scanning apparatuses and then saved as electronic files such as PDF (Portable Document Format) files. In a case that no scanning apparatus is in communication with the notebook computer, the images of simple documents such as single-sided papers or business cards may be captured by the computer peripheral devices (e.g. image pickup devices). The images captured by the built-in image pickup device are usually saved as JPEG (Joint Photographic Experts Group) files. However, most users prefer using scanning apparatuses to scan the text documents as PDF files because the texts and signs contained in the PDF files are readable by the computer systems and may be converted into editable text files As known, an optical character recognition (OCR) technique is a process of capturing an image of a document and then extracting the texts from that image. After an image of a document is captured by an image pickup device and saved as a JPEG file, the JPEG file may be analyzed according to the OCR technique. As a consequence, individual texts or signs contained in the JPEG file will be recognized and converted as an editable text file. Since the OCR technique is well established, image pickup devices are gradually adopted to acquire electronic image files of the documents.

Nowadays, a mouse having a shooting function has been introduced into the market. Generally, an image pickup device is installed on a casing of this mouse. The mouse may be used to control cursor movement of a computer system or select an icon shortcut. While the operation of the computer system is controlled by the user through the mouse, the image pickup device of the mouse may be used to shoot the document to acquire an electronic image file of the document.

Generally, there are two ways of using the image pickup device of the mouse to shoot the document. In the first way, the document is held by a user's hand, and the mouse is placed on a working plane (e.g. a desk plane) to shoot the document. In the second way, the document is placed on the working plane, and the mouse is held by the user's hand to shoot the document that is placed on the working plane. The way of holding the document by the user's hand and the way of holding the mouse are unsatisfied because the obtained images (i.e. the electronic image file of the document) are usually blurred. If the document or the mouse is handheld, the document or the mouse is readily rocked because of a hand-shaking action. Consequently, the document is blurred.

Moreover, in views of cost-effectiveness, the lens of the image pickup device of the mouse usually has a fixed focal length, and the focal length of the lens is not adjustable. In a case that no preview screen is used, it is difficult to precisely allow the image pickup device to focus on the document to shoot the document. Under this circumstance, the document image acquired by the image pickup device is still blurred.

Therefore, there is a need of providing a mouse with a shooting function and an image pickup system using such a mouse in order to enhance the shooting quality.

SUMMARY OF THE INVENTION

The present invention relates to a mouse with a shooting function and an image pickup system for providing an accurate shooting distance to shoot a document.

In accordance with an aspect of the present invention, there is provided a mouse with a shooting function. The mouse is in communication with a computer system. The mouse includes a casing, a supporting member and an image pickup device. The supporting member is disposed on the casing, and extensible from the casing toward a first end of the casing for fixing a business card. The image pickup device is arranged at the first end of the casing for shooting the business card, thereby acquiring a business card image. The business card fixed by the supporting member is separated from the image pickup device by a shooting distance.

In an embodiment, the supporting member includes a first extension arm, a second extension arm, a handle part, a first notch and a second notch. The first extension arm is arranged at a first side of the casing. The second extension arm is arranged at a second side of the casing. The handle part is arranged between a first end of the first extension arm and a first end of the second extension arm, and connected with the first extension arm and the second extension arm. The first notch is arranged beside the handle part for accommodating a first edge of the business card. The second notch is arranged beside the handle part for accommodating a second edge of the business card.

In an embodiment, the casing includes a first receptacle, a second receptacle and a third receptacle. The first receptacle is arranged at the first side of the casing for accommodating the first extension arm. When the first extension arm is accommodated within the first receptacle, a second end of the first extension arm and a first end of the first receptacle are in contact with each other. The second receptacle is arranged at the second side of the casing for accommodating the second extension arm. When the second extension arm is accommodated within the second receptacle, a second end of the second extension arm and a first end of the second receptacle are in contact with each other. The third receptacle is arranged at the first end of the casing for accommodating the handle part. When the second end of the first extension arm and the second end of the second extension arm are respectively moved to a second end of the first receptacle and a second end of the second receptacle, the business card accommodated within the first notch and the second notch is separated from the image pickup device by the shooting distance.

In an embodiment, the casing further includes a first triggering switch and a second triggering switch. The first triggering switch is disposed within the first receptacle and arranged beside the second end of the first receptacle. When the first extension arm is pulled out and located at the second end of the first receptacle, the first triggering switch is not pushed by the first extension arm. Whereas, when the first extension arm is accommodated within the first receptacle, the first triggering switch is pushed by the first extension arm.

The second triggering switch is disposed within the second receptacle and arranged beside the second end of the second receptacle. When the second extension arm is pulled out and located at the second end of the second receptacle, the second triggering switch is not pushed by the second extension arm. Whereas, when the second extension arm is accommodated within the second receptacle, the second triggering switch is pushed by the second extension arm.

In an embodiment, the computer system includes a shooting program. When the business card is separated from the image pickup device by the shooting distance, a shooting signal is issued to the image pickup device. In response to the shooting signal, the image pickup device shoots the business card to acquire the business card image.

In an embodiment, the computer system further includes a monitor for showing the business card image and a preview interface of the shooting program. The preview interface is configured for showing a positioning frame and a pre-shot business card image.

In an embodiment, when the business card is separated from the image pickup device by the shooting distance, the pre-shot business card image is included in the positioning frame.

In accordance with another aspect of the present invention, there is provided an image pickup system for shooting a business card to acquire a business card image. The image pickup system includes a mouse and a computer system. The mouse includes a supporting member and an image pickup device. The supporting member is selectively accommodated within a casing of the mouse or protruded out of the casing, wherein the supporting member is configured to fix the business card. The image pickup device is arranged at the first end of the casing for shooting the business card, thereby acquiring the business card image. The computer system is electrically connected with the mouse. A shooting program is installed in the computer system for judging whether the business card is supported by the supporting member. If the shooting program judges that the business card is supported by the supporting member, the image pickup device is enabled to shoot the business card, thereby acquiring the business card image.

In an embodiment, the supporting member includes a first extension arm, a second extension arm, a handle part, a first notch and a second notch. The first extension arm is arranged at a first side of the casing. The second extension arm is arranged at a second side of the casing. The handle part is arranged between a first end of the first extension arm and a first end of the second extension arm, and connected with the first extension arm and the second extension arm. The first notch is arranged beside the handle part for accommodating a first edge of the business card. The second notch is arranged beside the handle part for accommodating a second edge of the business card.

In an embodiment, the casing of the mouse includes a first receptacle, a second receptacle and a third receptacle. The first receptacle is arranged at the first side of the casing for accommodating the first extension arm. When the first extension arm is accommodated within the first receptacle, a second end of the first extension arm and a first end of the first receptacle are in contact with each other. The second receptacle is arranged at the second side of the casing for accommodating the second extension arm. When the second extension arm is accommodated within the second receptacle, a second end of the second extension arm and a first end of the second receptacle are in contact with each other. The third receptacle is arranged at the first end of the casing for accommodating the handle part. When the second end of the first extension arm and the second end of the second extension arm are respectively moved to a second end of the first receptacle and a second end of the second receptacle, the business card accommodated within the first notch and the second notch is separated from the image pickup device by the shooting distance.

In an embodiment, the casing of the mouse further includes a first triggering switch and a second triggering switch. The first triggering switch is disposed within the first receptacle and arranged beside the second end of the first receptacle. When the first extension arm is pulled out and located at the second end of the first receptacle, the first triggering switch is not pushed by the first extension arm. Whereas, when the first extension arm is accommodated within the first receptacle, the first triggering switch is pushed by the first extension arm. The second triggering switch is disposed within the second receptacle and arranged beside the second end of the second receptacle. When the second extension arm is pulled out and located at the second end of the second receptacle, the second triggering switch is not pushed by the second extension arm. Whereas, when the second extension arm is accommodated within the second receptacle, the second triggering switch is pushed by the second extension arm.

In an embodiment, the computer system further includes a monitor for showing the business card image and a preview interface of the shooting program. The preview interface is configured for showing a positioning frame and a pre-shot business card image.

In an embodiment, when the business card is separated from the image pickup device by the shooting distance, the pre-shot business card image is included in the positioning frame.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a mouse with functions of fixing and shooting a document as well as an image pickup system.

Figure 1:
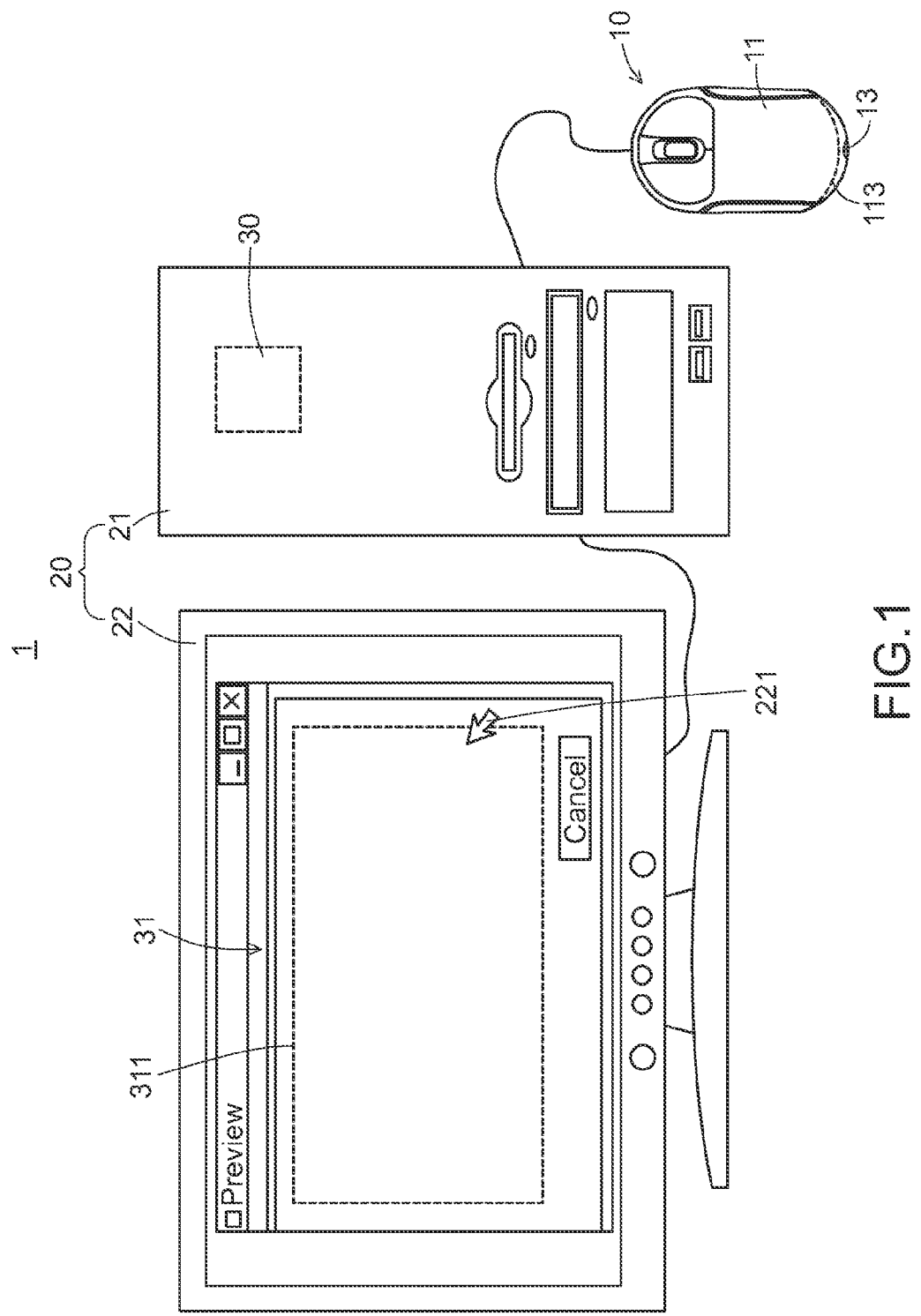
FIG. 1 is a schematic view illustrating the architecture of an image pickup system according to an embodiment of the present invention.

FIG. 1 is a schematic view illustrating the architecture of an image pickup system according to an embodiment of the present invention. As shown in FIG. 1, the image pickup system 1 comprises a mouse 10, a computer system 20 and a shooting program 30. The computer system 20 comprises a computer host 21 and a monitor 22. The computer host 21 is in communication with the monitor 22. The shooting program 30 is installed in the computer host 21. When the shooting program 30 is activated, a preview interface 31 of the shooting program 30 is shown on the monitor 22. The preview interface 31 is configured for showing a positioning frame 311 and a pre-shot business card image 312 (see FIG. 4).

Please refer to FIG. 1 again. The mouse 10 is in communication with the computer host 21 for controlling a cursor 221 shown on the monitor 22. The components of the mouse 10 for controlling the cursor 221 include a left button, a right button and a scroll wheel. The operating principles of these components are well known in the art, and are not redundantly described herein.

Figure 2:
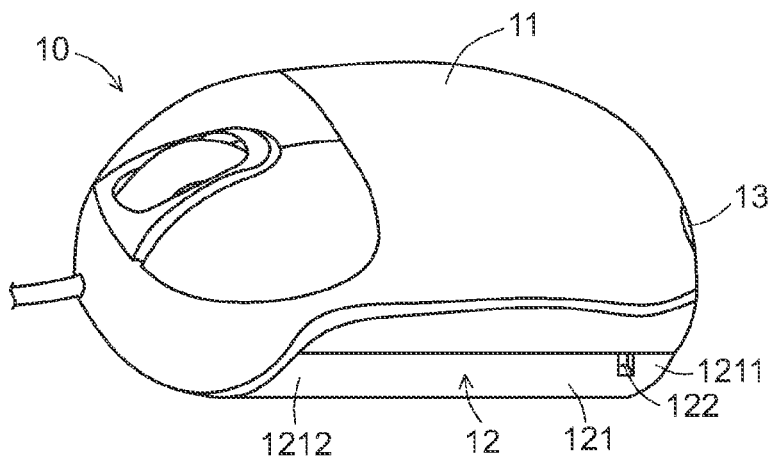
FIG. 2 is a schematic perspective view illustrating the mouse of the image pickup system in a cursor control mode according to an embodiment of the present invention.
Figure 3:
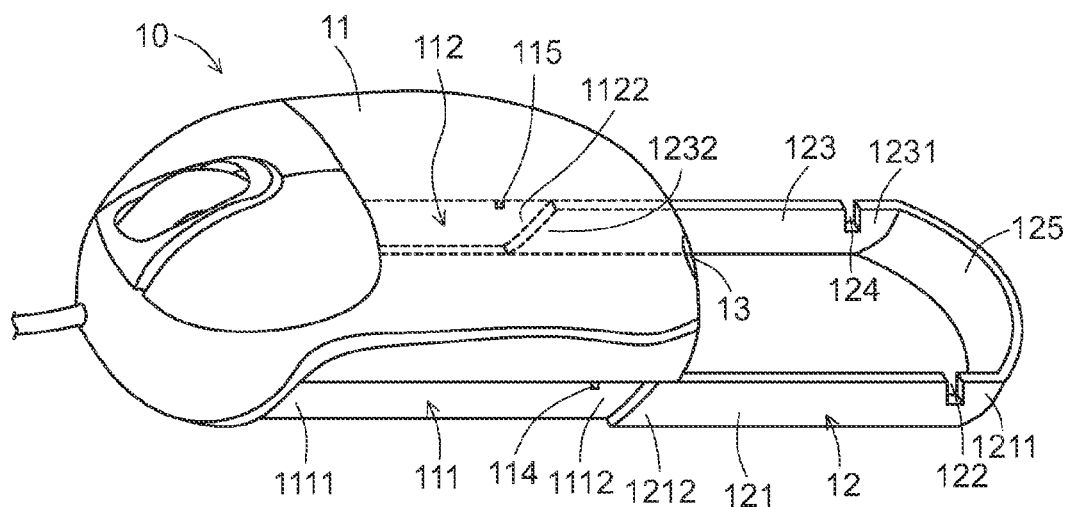
FIG. 3 is a schematic perspective view illustrating the mouse of the image pickup system in a shooting mode according to an embodiment of the present invention.

Hereinafter, the detailed configurations of the mouse 10 with the shooting function will be illustrated with reference to FIGS. 2 and 3. FIG. 2 is a schematic perspective view illustrating the mouse of the image pickup system in a cursor control mode according to an embodiment of the present invention. FIG. 3 is a schematic perspective view illustrating the mouse of the image pickup system in a shooting mode according to an embodiment of the present invention. The mouse 10 comprises a casing 11, a supporting member 12 and an image pickup device 13.

Figure 4:
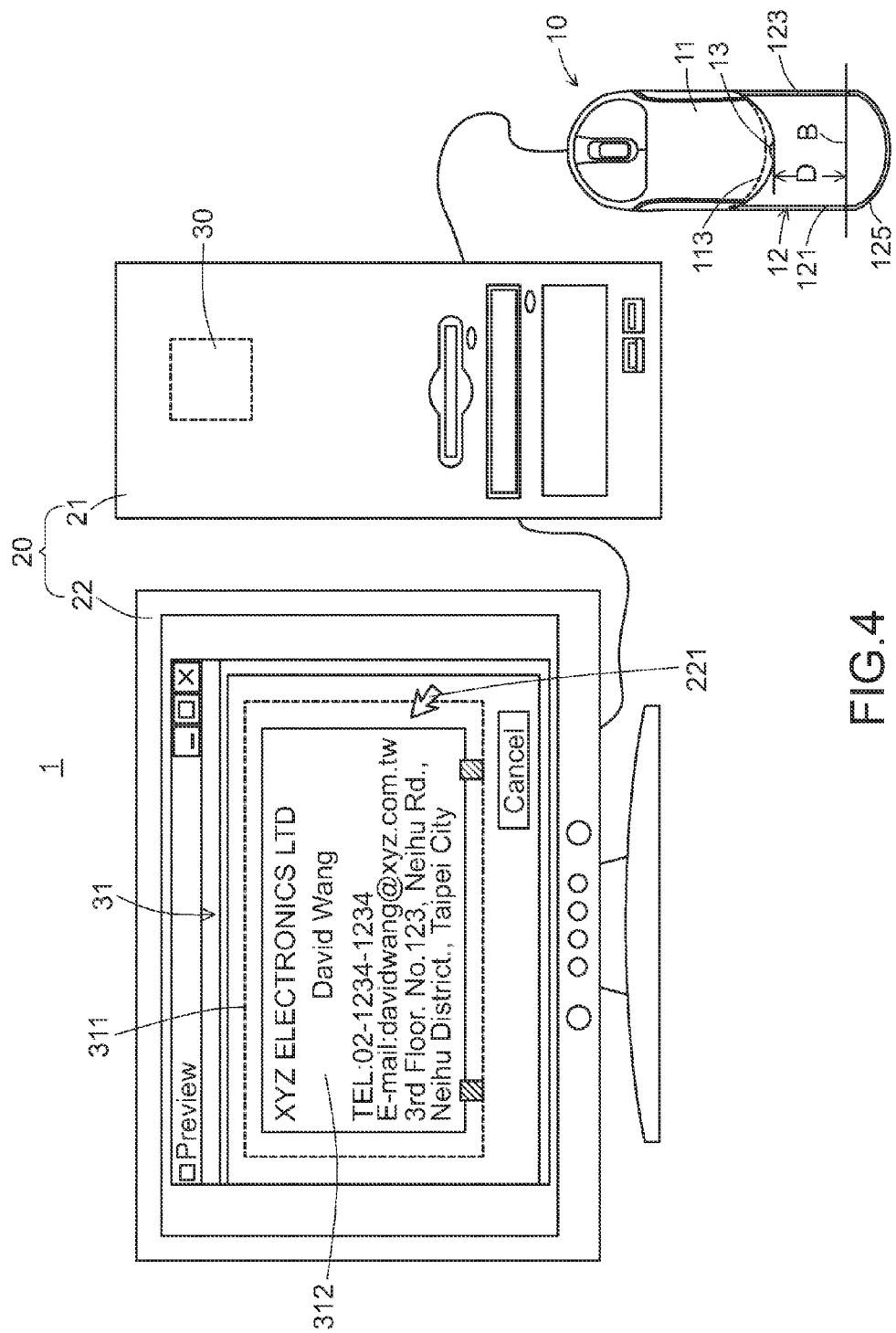
FIG. 4 is a schematic view illustrating the operations of the image pickup system of the present invention, in which the mouse is operated in the shooting mode.

The image pickup device 13 is arranged at a first end of the casing 11 (e.g. a rear end of the casing 11) for shooting a business card B (see FIG. 4). In this embodiment, the image pickup device 13 is arranged at the rear end of the casing 11.

The supporting member 12 comprises a first extension arm 121, a first notch 122, a second extension arm 123, a second notch 124, a handle part 125. The first extension arm 121 is arranged at a first side of the casing 11, and extensible from the casing 11 toward the first end of the casing 11 (i.e. the rear end of the casing 11). The notch 122 is disposed in a first end 1211 of the first extension arm 121 for accommodating a first edge of the business card B. The second extension arm 123 is arranged at a second side of the casing 11, and extensible from the casing toward the first end of the casing 11 (i.e. the rear end of the casing 11). The second notch 124 is disposed in a first end 1231 of the second extension arm 123 for accommodating a second edge of the business card B. The handle part 125 is arranged between the first end 1211 of the first extension arm 121 and the first end 1231 of the second extension arm 123, and connected with the first extension arm 121 and the second extension arm 123. By grasping the handle part 125, the supporting member 12 may be pulled out of the casing 11.

The casing 11 comprises a first receptacle 111, a second receptacle 112 and a third receptacle 113 (see FIG. 1). The first receptacle 111 is arranged at a first side of the casing 11 (e.g. the left side of the casing 11 as shown in FIG. 3) for accommodating the first extension arm 121, so that a second end 1212 of the first extension arm 121 and a first end 1111 of the first receptacle 111 are in contact with each other. The second receptacle 112 is arranged at a second side of the casing 11 (e.g. the right side of the casing 11 as shown in FIG. 3) for accommodating the second extension arm 123, so that a second end 1232 of the first extension arm 121 and a first end (not shown) of the second receptacle 112 are in contact with each other. The third receptacle 113 is arranged at the first end of the casing 11 (i.e. the rear end of the casing 11) and disposed under the image pickup device 13 for accommodating the handle part 125. When the first extension arm 121, the second extension arm 123 and the handle part 125 are respectively accommodated within the first receptacle 111, the second receptacle 112 and the third receptacle 113, the mouse 10 is operated in a cursor control mode (see FIG. 2).

When the first extension arm 121 and the second extension arm 123 are pulled out to respectively move the second end 1212 of the first extension arm 121 and the second end 1232 of the second extension arm 123 to a second end 1112 of the first receptacle 111 and a second end 1122 of the second receptacle 112, the mouse 10 is operated in a shooting mode (see FIGS. 3 and 4). In this situation, after the business card B is accommodated within the first notch 122 and the second notch 124, the distance between the business card B and the image pickup device 13 is substantially equal to a shooting distance D. Moreover, the casing 11 further comprises a first triggering switch 114 and a second triggering switch 115. The first triggering switch 114 is disposed within the first receptacle 111 and arranged beside the second end 1112 of the first receptacle 111. The second triggering switch 115 is disposed within the second receptacle 112 and arranged beside the second end 1122 of the second receptacle 112. When the first extension arm 121 and the second extension arm 123 are pulled out and respectively located at the second end 1112 of the first receptacle 111 and the second end 1122 of the second receptacle 112, the first triggering switch 114 and the second triggering switch 115 are no longer pushed by the first extension arm 121 and the second extension arm 123. Under this circumstance, the operating mode of the mouse 10 is changed to the shooting mode. On the other hand, when the first extension arm 121 and the second extension arm 123 are respectively accommodated within the first receptacle 111 and the second receptacle 112, the first triggering switch 114 and the second triggering switch 115 are pushed by the first extension arm 121 and the second extension arm 123. Under this circumstance, the operating mode of the mouse 10 is changed to the cursor control mode.

It is noted that the shooting distance D is equal to the focal length of the image pickup device 13. Consequently, after the business card B is accommodated within the first notch 122 and the second notch 124 and the business card B is shot by the image pickup device 13, a sharp business card image will be acquired. Moreover, for assuring that the distance between the business card B and the image pickup device 13 is substantially equal to a shooting distance D, the lengths of the first extension arm 121 and the second extension arm 123 and the locations of the first notch 122 and the second notch 124 should be elaborately predetermined by calculation.

Hereinafter, the operations of the image pickup system 1 will be illustrated with reference to FIG. 4. FIG. 4 is a schematic view illustrating the operations of the image pickup system of the present invention, in which the mouse is operated in the shooting mode. For using the image pickup system 1 to shoot the business card B, the first extension arm 121 and the second extension arm 123 may be pulled out of the first receptacle 111 and the second receptacle 112, so that the second end 1212 of the first extension arm 121 and the second end 1232 of the second extension arm 123 are respectively moved to a second end 1112 of the first receptacle 111 and a second end 1122 of the second receptacle 112. Since the first triggering switch 114 and the second triggering switch 115 are no longer pushed by the first extension arm 121 and the second extension arm 123, the mouse 10 is changed from the cursor control mode to the shooting mode. As the mouse 10 enters the shooting mode, the shooting program 30 installed in the computer host 21 is activated and the image pickup device 13 arranged at the first end of the casing 11 is enabled.

Then, when the business card B to be shot is placed within the first notch 122 and the second notch 124, a pre-shot business card image 312 of the business card B is simultaneously shown on the preview interface 31, and the pre-shot business card image 312 is included in the positioning frame 311. At this moment, the shooting program 30 may judge whether the business card B is placed in the right position according to the condition whether the pre-shot business card image 312 is completely included in the positioning frame 311. If the shooting program 30 judges that the business card B is placed in the right position, it means that the distance between the business card B and the image pickup device 13 is substantially equal to a shooting distance D. Meanwhile, a shooting signal is transmitted to the image pickup device 13. In response to the shooting signal, the image pickup device 13 shoots the business card B, thereby acquiring the business card image.

After the shooting operation is completed, the business card B may be removed from the first notch 122 and the second notch 124. Then, the first extension arm 121, the second extension arm 123 and the handle part 125 are respectively accommodated within the first receptacle 111, the second receptacle 112 and the third receptacle 113. Meanwhile, the first triggering switch 114 and the second triggering switch 115 are pushed by the first extension arm 121 and the second extension arm 123, so that operating mode of the mouse 10 is changed to the cursor control mode. Consequently, the user may operate the mouse 10 to move the cursor 221.

From the above description, the mouse of the image pickup system of the present invention comprises a supporting member for supporting a business card and an image pickup device for shooting the business card. Consequently, the business card to be shot can be securely placed on the supporting member, and during the shooting process, the mouse is placed on a working plane (e.g. a desk plane). Since the image pickup device is fixed on the mouse that is placed on the working plane and the business card is securely placed on the supporting member, the business card image acquired by the image pickup device will be sharp because the adverse influence of the handshaking action is eliminated. Moreover, since the focal length of the image pickup device for shooting the business card and is taken into consideration to design the supporting member, the distance between the business card supported on the supporting member and the image pickup device is equal to the shooting distance (i.e. the focal length of the image pickup device). Under this circumstance, the image pickup device of the mouse of the present invention can precisely focus on the business card in order to obviate the drawbacks encountered from the prior art.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse with a shooting function, said mouse being in communication with a computer system and comprising:
    a casing;
    a supporting member disposed on said casing, and extensible from said casing toward a first end of said casing for fixing a business card; and
    an image pickup device arranged at said first end of said casing for shooting said business card, thereby acquiring a business card image, wherein said business card fixed by said supporting member is separated from said image pickup device by a shooting distance.

2. The mouse with a shooting function according to claim 1 wherein said supporting member comprises:
    a first extension arm arranged at a first side of said casing;
    a second extension arm arranged at a second side of said casing;
    a handle part arranged between a first end of said first extension arm and a first end of said second extension arm, and connected with said first extension arm and said second extension arm;
    a first notch arranged beside said handle part for accommodating a first edge of said business card; and
    a second notch arranged beside said handle part for accommodating a second edge of said business card.

3. The mouse with a shooting function according to claim 2 wherein said casing comprises:
    a first receptacle arranged at said first side of said casing for accommodating said first extension arm, wherein when said first extension arm is accommodated within said first receptacle, a second end of said first extension arm and a first end of said first receptacle are in contact with each other;
    a second receptacle arranged at said second side of said casing for accommodating said second extension arm, wherein when said second extension arm is accommodated within said second receptacle, a second end of said second extension arm and a first end of said second receptacle are in contact with each other; and
    a third receptacle arranged at said first end of said casing for accommodating said handle part, wherein when said second end of said first extension arm and said second end of the second extension arm are respectively moved to a second end of said first receptacle and a second end of said second receptacle, said business card accommodated within said first notch and said second notch is separated from said image pickup device by said shooting distance.

4. The mouse with a shooting function according to claim 3 wherein said casing further comprises:
    a first triggering switch disposed within said first receptacle and arranged beside said second end of said first receptacle, wherein when said first extension arm is pulled out and located at said second end of said first receptacle, said first triggering switch is not pushed by said first extension arm, wherein when said first extension arm is accommodated within said first receptacle, said first triggering switch is pushed by said first extension arm; and
    a second triggering switch disposed within said second receptacle and arranged beside said second end of said second receptacle, wherein when said second extension arm is pulled out and located at said second end of said second receptacle, said second triggering switch is not pushed by said second extension arm, wherein when said second extension arm is accommodated within said second receptacle, said second triggering switch is pushed by said second extension arm.

5. The mouse with a shooting function according to claim 1 wherein said computer system comprises a shooting program, wherein when said business card is separated from said image pickup device by said shooting distance, a shooting signal is issued to said image pickup device, wherein in response to said shooting signal, said image pickup device shoots said business card to acquire said business card image.

6. The mouse with a shooting function according to claim 5 wherein said computer system further comprises a monitor for showing said business card image and a preview interface of said shooting program, wherein said preview interface is configured for showing a positioning frame and a pre-shot business card image.

7. The mouse with a shooting function according to claim 6 wherein when said business card is separated from said image pickup device by said shooting distance, said pre-shot business card image is included in said positioning frame.

8. An image pickup system for shooting a business card to acquire a business card image, said image pickup system comprising:
   a mouse comprising:
      a supporting member selectively accommodated within a casing of said mouse or protruded out of said casing, wherein said supporting member is configured to fix said business card; and
      an image pickup device arranged at said first end of said casing for shooting said business card, thereby acquiring said business card image;
   a computer system electrically connected with said mouse, wherein a shooting program is installed in said computer system for judging whether said business card is supported by said supporting member, wherein if said shooting program judges that said business card is supported by said supporting member, said image pickup device is enabled to shoot said business card, thereby acquiring said business card image.

9. The image pickup system according to claim 8 wherein said supporting member comprises:
   a first extension arm arranged at a first side of said casing;
   a second extension arm arranged at a second side of said casing;
   a handle part arranged between a first end of said first extension arm and a first end of said second extension arm, and connected with said first extension arm and said second extension arm;
   a first notch arranged beside said handle part for accommodating a first edge of said business card; and
   a second notch arranged beside said handle part for accommodating a second edge of said business card.

10. The image pickup system according to claim 9 wherein said casing of said mouse comprises:
   a first receptacle arranged at said first side of said casing for accommodating said first extension arm, wherein when said first extension arm is accommodated within said first receptacle, a second end of said first extension arm and a first end of said first receptacle are in contact with each other;
   a second receptacle arranged at said second side of said casing for accommodating said second extension arm, wherein when said second extension arm is accommodated within said second receptacle, a second end of said second extension arm and a first end of said second receptacle are in contact with each other; and
   a third receptacle arranged at said first end of said casing for accommodating said handle part, wherein when said second end of said first extension arm and said second end of the second extension arm are respectively moved to a second end of said first receptacle and a second end of said second receptacle, said business card accommodated within said first notch and said second notch is separated from said image pickup device by said shooting distance.

11. The image pickup system according to claim 10 wherein said casing of said mouse further comprises:
   a first triggering switch disposed within said first receptacle and arranged beside said second end of said first receptacle, wherein when said first extension arm is pulled out and located at said second end of said first receptacle, said first triggering switch is not pushed by said first extension arm, wherein when said first extension arm is accommodated within said first receptacle, said first triggering switch is pushed by said first extension arm; and
   a second triggering switch disposed within said second receptacle and arranged beside said second end of said second receptacle, wherein when said second extension arm is pulled out and located at said second end of said second receptacle, said second triggering switch is not pushed by said second extension arm, wherein when said second extension arm is accommodated within said second receptacle, said second triggering switch is pushed by said second extension arm.

12. The image pickup system according to claim 8 wherein said computer system further comprises a monitor for showing said business card image and a preview interface of said shooting program, wherein said preview interface is configured for showing a positioning frame and a pre-shot business card image.

13. The image pickup system according to claim 12 wherein when said business card is separated from said image pickup device by said shooting distance, said pre-shot business card image is included in said positioning frame.

* * * * *